US008094114B2

(12) United States Patent
Chuang

(10) Patent No.: US 8,094,114 B2
(45) Date of Patent: Jan. 10, 2012

(54) DISPLAY APPARATUS AND METHOD FOR TRANSMITTING CONTROL SIGNALS THEREOF

(75) Inventor: Chih-Chiang Chuang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 653 days.

(21) Appl. No.: 11/562,987

(22) Filed: Nov. 23, 2006

(65) Prior Publication Data

US 2008/0074378 A1 Mar. 27, 2008

(30) Foreign Application Priority Data

Sep. 25, 2006 (TW) .............................. 95135349 A

(51) Int. Cl.
*G09G 3/36* (2006.01)
*G09G 5/00* (2006.01)
*G06F 3/038* (2006.01)

(52) U.S. Cl. .............. 345/98; 345/87; 345/99; 345/100; 345/204

(58) Field of Classification Search ..................... 345/98
See application file for complete search history.

(56) References Cited

U.S. PATENT DOCUMENTS

| | | | | |
|---|---|---|---|---|
| 5,974,464 | A * | 10/1999 | Shin et al. | 709/231 |
| 6,373,419 | B1 * | 4/2002 | Nakao | 341/154 |
| 6,441,857 | B1 * | 8/2002 | Wicker et al. | 348/441 |
| 6,819,311 | B2 | 11/2004 | Nose et al. | |
| 6,954,491 | B1 * | 10/2005 | Kim et al. | 375/220 |
| 2003/0146896 | A1 * | 8/2003 | Sekine | 345/98 |
| 2004/0104881 | A1 * | 6/2004 | Furuya | 345/98 |
| 2005/0057549 | A1 * | 3/2005 | Tachibana et al. | 345/205 |
| 2005/0128175 | A1 * | 6/2005 | Hong | 345/100 |
| 2005/0253794 | A1 | 11/2005 | Lee et al. | |
| 2006/0007083 | A1 | 1/2006 | Pai et al. | |
| 2006/0262065 | A1 * | 11/2006 | Luo et al. | 345/98 |
| 2008/0030615 | A1 * | 2/2008 | Vasquez et al. | 348/446 |

* cited by examiner

*Primary Examiner* — Bipin Shalwala
*Assistant Examiner* — Ilana Spar
(74) *Attorney, Agent, or Firm* — Jianq Chyun IP Office

(57) ABSTRACT

A display apparatus and a method for transmitting control signals are disclosed. The display apparatus comprises comparatively a fewer number of control signal lines between the timing controller and the gate driver and/or between the timing controller and the source driver to transmit control signals. Thus, problems due to system complexity, noise and electromagnetic interference may be reduced, and the overall fabrication cost may be effectively reduced.

27 Claims, 6 Drawing Sheets

DISPLAY APPARATUS AND METHOD FOR TRANSMITTING CONTROL SIGNALS THEREOF

CROSS-REFERENCE TO RELATED APPLICATION

This application claims the priority benefit of Taiwan application serial no. 95135349, filed Sep. 25, 2006. All disclosure of the Taiwan application is incorporated herein by reference.

BACKGROUND OF THE INVENTION

1. Field of the Invention

The present invention relates to a display apparatus, and more particularly to a display apparatus and a method for transmitting control signals.

2. Description of Related Art

In general, many signal lines are required to link a timing controller and a gate driver so that all kinds of control signals, for example, gate start pulse signal, gate clock signal, output enable signal and so on, can be transmitted. More and more application examples, such as U.S. Patent No. 20050253794A1, U.S. Patent No. 20060007083A1 and U.S. Pat. No. 6,819,311B2, can be given that uses the on/off state of a gate driver signal to resolve the fuzziness problem in a liquid crystal display. Because of this, an increasing number of control signal lines must be used to control the functions of the gate driver. Similarly, many signal lines must be established between a conventional timing controller and a source driver for transmitting all kinds of control signals.

FIG. 1 is a block diagram of conventional panel display. The conventional panel display includes a low-voltage differential signal transmitter 101, a timing controller 102, a source driver 103, a gate driver 104 and a display panel 105. The timing controller 102 transmits the image data DATA output by the low-voltage differential signal transmitter 101 to the source driver 103 according to the timing sequence. According to the timing of the image data DATA, the timing controller 102 also transmits a clock signal PCLK, a source start pulse (STH), a line latching signal LOAD, a polarity signal POL and other signals to the source driver 103. Similarly, many signal lines must also be set up between the timing controller 102 and the gate driver 104 for transmitting all kinds of control signals, for example, a gate start pulse signal STV, a gate clock signal CPV, an output enable signal OE and so on. The display panel 105 is coupled to the source driver 103 and the gate driver 104 so that pictures can be displayed when driven by the source lines S0~Si of the source driver 103 and the gate lines G1~Gj of the gate driver 104. However, an increasing the number of control lines will lead to an increase in the system loading and an intensification of noise and electromagnetic interference. Furthermore, using too many control lines is not only unrealistic in many applications and designs, but also leads to a significant increase in the production cost.

SUMMARY OF THE INVENTION

Accordingly, at least one objective of the present invention is to provide a display device such that the number of control signals connecting between a timing controller and a driver unit is reduced to achieve the same purpose as that requiring many control signals in the prior technique.

At least another objective of the present invention is to provide a transmission method of control signals. The transmission method of control signals may use a few signal lines to transmit encoded command signals, thereby reducing the number of control signal lines required to connect between the timing controller and the driver unit. Therefore, fewer signal lines may be used to represent the behavioral mode of the control signals described by the conventional timing controller and hence meet the demand for providing a plurality of control signals.

At least yet another objective of the present invention is to provide a transmission method of the control signals of a display apparatus. The transmission method uses fewer signal lines to transmit encoded command signals for providing the transmission operation of a plurality of control signals. According to a clock signal and a mode signal, a driver unit decodes the command signal to recover the original control signal and drives the display panel according to the image data and the control signal.

To achieve these and other advantages and in accordance with the purpose of the invention, as embodied and broadly described herein, the invention provides a display apparatus comprising a timing controller, a driver unit and a display panel. The timing controller outputs image data, clock signal, mode signal and at least one command signal according to a timing sequence. According to the timing of the clock signal and the mode signal, the timing controller encodes a number of control signals and adds the command signal. The driver unit is coupled to the timing controller to receive the image data and decode the command signal according to the timing of the clock signal and the mode signal so as to recover the aforementioned control signals. The display panel is coupled to the driver unit and displays pictures according to the driving signal provided by the output line of the driver.

In a preferred embodiment of the present invention, the driver unit includes a gate driver and a source driver. The gate driver is coupled between the timing controller and the display panel and drives the display panel according to the control provided by the timing controller. The source driver is coupled between the timing controller and the display panel and receives the image data and drives the display panel according to the control of the timing controller.

In a preferred embodiment of the present invention, the source driver includes a control signal decoder, a shift register, a line latch, a level shifter, a digital/analog converter and an output buffer. The control signal decoder is coupled to the timing controller for decoding the command signal and recovering and outputting the aforementioned control signal according to the timing of the clock signal and the mode signal. The control signal may include a source start pulse, a line latching signal and a polarity signal. The shift register is coupled to the control signal decoder for receiving the source start pulse output by the control signal decoder and transmitting and outputting the source start pulse by stages to serve as a channel latching signal according to the timing of the clock signal. The line latch is coupled to the control signal decoder and the shift register for latching the image data according to the timing of each channel latching signal, and outputting the latched image data according to the timing of the line latching signal output by the control signal decoder. The level shifter is coupled to the line latch for receiving and changing the level of the image data output by the line latch. The digital/analog converter is coupled to the control signal decoder and the level shifter for converting to an analog driving signal of a corresponding polarity according to the polarity signal output by the control signal decoder and the image data output by the level shifter. The output buffer is coupled to the digital/analog converter for receiving the analog driving signal and outputting a source line signal to drive the display panel.

In a preferred embodiment of the present invention, the gate driver includes a control signal decoder, a shift register, an output enable control logic, a level shifter and an output buffer. The control signal decoder is coupled to the timing controller for decoding and recovering according to the timing of the clock signal and the mode signal and outputting the aforementioned control signals. The control signals may include a gate start pulse, a gate clock signal and an output enable signal. The shift register is coupled to the control signal decoder for receiving the gate start pulse and transmitting and outputting the gate start pulse by stages to serve as a scan signal according to the timing of the gate clock signal. The output enable control logic is coupled to the control signal decoder and the shift register for receiving and outputting the scan signal, wherein the output of the output enable control logic is controlled by the output enable signal. The level shifter is coupled to the output enable control logic for receiving and changing the output level of the output enable control logic. The output buffer is coupled to the level shifter for receiving the output gate line of the level shifter and driving the display panel.

From another point of view, the present invention also provides a transmission method of control signals. The transmission method includes providing a plurality of control signals and encoding the aforementioned control signals and adding in at least one command signal. The steps for encoding the aforementioned control signals include using the mode signal to define a command mode period, defining a plurality of command code periods during the command mode period according to the timing of the clock signal, wherein each command code period represents one of the aforementioned control signals. According to the states of the aforementioned control signals, the timing controller determines the logic level of the command signal during the command code period. Thereafter, the clock signal, the mode signal and the command signal are transmitted to a next stage circuit. The next stage circuit decodes the command signal according to the timing of the clock signal and the mode signal and recovers the aforementioned control signals.

According to another embodiment of the present invention, a method of transmitting control signals of a display apparatus is provided, which comprises the following steps. First, a plurality of control signals and image data are provided. Next, the aforementioned control signals are encoded and at least one command signal is added according to the timing of a clock signal and a mode signal. Next, the image data, the clock signal, the mode signal and the command signal are transmitted to the driver unit. The driver unit decodes the command signal according to the timing of the clock signal and the mode signal and recovers into the control signals. The driver unit of the display apparatus drives the display panel according to the image data and the recovered control signals.

In a preferred embodiment of the present invention, the step of encoding the control signals and adding the command signal includes using the mode signal to define a command mode period and defining a plurality of command code periods during the command mode period according to the timing of the clock signal. Each command code period represents one of the control signals. The logic value of the command signal during the command code period is determined according to the states of the control signals.

In a preferred embodiment of the present invention, the mode signal is set to an enable state when a level transition occurs in one of the control signals, wherein the enable period of the mode signal is the command mode period. During the command mode period, if one of the control signals is a high logic level, then the logic value of the command signal corresponding to the command code period is set to '1'. If one of the control signals is a low logic level, the logic value of the command signal corresponding to the command code period is set to '0'.

In a preferred embodiment of the present invention, the control signals may be the internal control signals of the display apparatus. The internal timing controller of the display apparatus outputs the control signals to the driver unit (the source driver and/or the gate driver).

In a preferred embodiment of the present invention, the control signals output to the source driver include a source start pulse, a line latching signal and a polarity signal. The control signals output to the gate driver include a gate start pulse, a gate clock signal and an output enable signal. In an embodiment, the control signals may include a black insert control signal. The display apparatus can be a liquid crystal display.

In the present embodiment, a number of control signals are encoded and a number of command signals are added according to the timing of the clock signal and the mode signal. Therefore, a few signal lines can be used to replace the many control signal lines required by a conventional transmission method. The next stage circuit (for example, the driver unit of the display apparatus) decodes the command signals according to the timing of the clock signal and the mode signal and recovers the control signals. Hence, the driver unit inside the display apparatus can drive the display panel according to the image data and the recovered control signals. Thus, compared to the conventional art in which the timing controller and the driver unit is required to transmit many control signals through several signal lines, in the embodiment of the present invent, comparatively only a few signal lines is required to transmit several control signals. Because the display device of the present invention requires comparatively a few signal lines between the timing controller and the driver to transmit several control signals, the problems caused due to too many control signal lines between the timing controller and the driver, as in the case of the conventional art, may be effectively avoided. Furthermore, by reducing the number of control lines, the cost of applying the design to an integrated circuit packages may be reduced, the space occupation of circuit layout may be minimized and the levels of noise and electromagnetic interference may be effectively attenuated.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
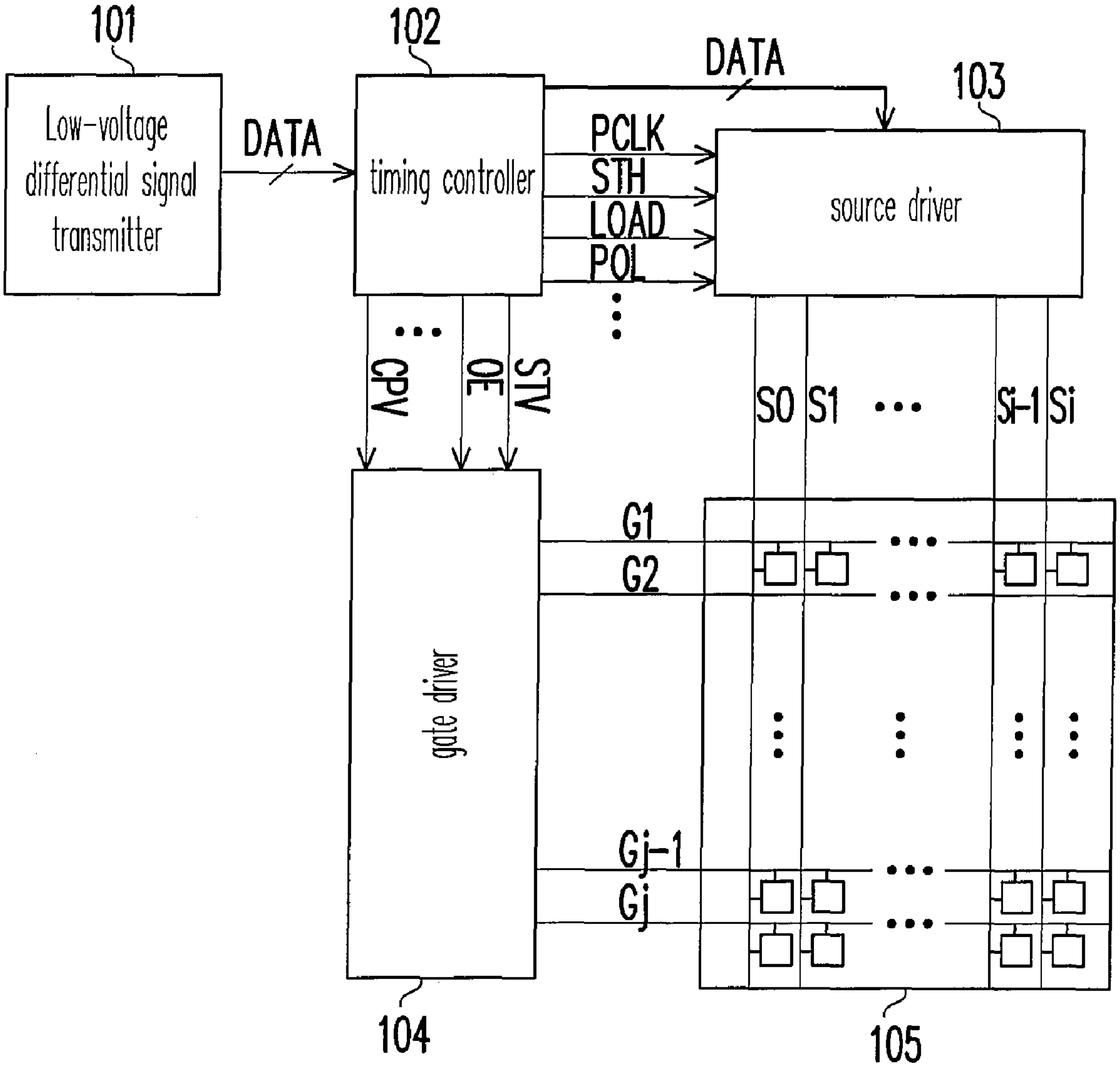
FIG. 1 (PRIOR ART)
FIG. 1 is a circuit diagram of a conventional display apparatus and a method for transmitting control signals thereof.

Reference will now be made in detail to the present preferred embodiments of the invention, examples of which are illustrated in the accompanying drawings. Wherever possible, the same reference numbers are used in the drawings and the description to refer to the same or like parts.

In the following embodiments, when a device is said to be 'connected' or 'coupled' to another device, it can be directly connected or coupled to the other device or else connected or coupled through an intermediate device. On the contrary, when a device is said to be directly 'connected or coupled to another device, it is to be understood that there is no intermediate device in the connection.

Figure 2:
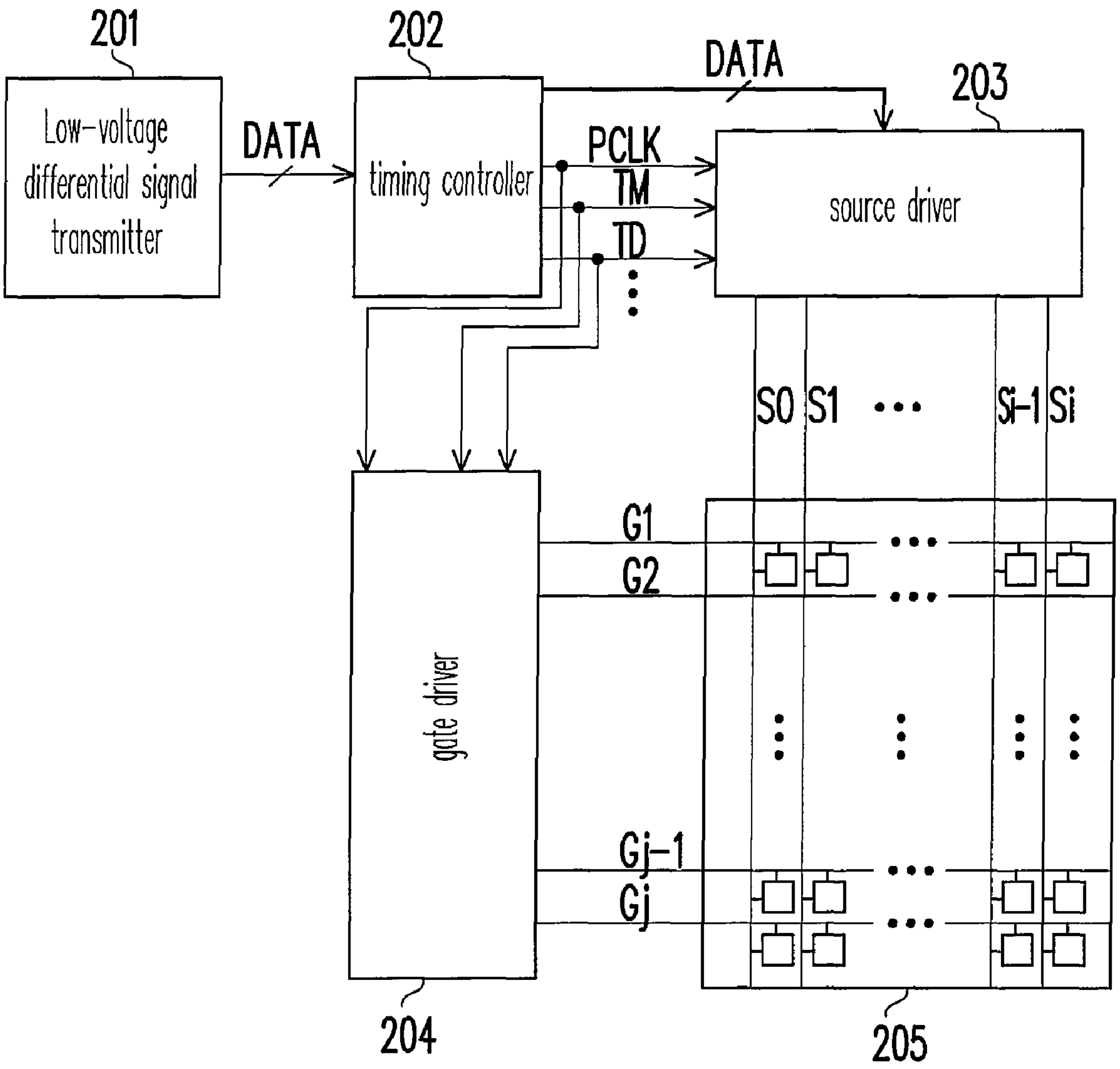
FIG. 2 is a circuit diagram of a display apparatus and a method for transmitting control signals thereof according to an embodiment of the present invention.

FIG. 2 is a circuit diagram of a display apparatus and a method for transmitting control signals thereof according to an embodiment of the present invention. The display apparatus may be a liquid crystal display. As shown in FIG. 2, the circuit of the display apparatus includes a low-voltage differential signal transmitter 201, a timing controller 202, driver units and a display panel (a liquid crystal display panel) 205. The foregoing driver units include a gate driver 204 and a source driver 203. The low-voltage differential signal transmitter 201 outputs image data DATA to the timing controller 202 and the timing controller 202 transmits the image data DATA to the source driver 203. The timing controller 202 also transmits a clock signal PCLK, a mode signal TM and at least one command signal TD correspond to the timing of the image data DATA. The command signal TD is a signal formed by the timing controller 202 encoding a plurality of control signals according to the timing of the clock signal PCLK and the mode signal TM. The source driver 203 and the gate driver 204 of the driver unit are used for receiving the image data and decoding the command signal TD according to the timing of the clock signal PCLK and the mode signal TM to recover the control signals. The display panel 205 is coupled to the driver units (the source driver 203 and the gate driver 204) for displaying pictures when driven by the source lines S0~Si and the gate lines G1~Gj of the driver units.

Although the source driver 203 and the gate driver 204 are used in the present embodiment to illustrate the implementation of the driver units, it should be understood that the embodiment of the present invention should not be limited there-to. For example, the source driver 203 may obtain various control signals through the clock signal PCLK, the mode signal TM and the command signal TD and the gate driver 204 may obtain the required control signals directly from the timing controller 202 without encoding. Conversely, the gate driver 204 may obtain various control signals through the clock signal PCLK, the mode signal TM and the command signal TD and the source driver 203 may obtain the required control signals directly from the timing controller 202 without any encoding.

Figure 3:
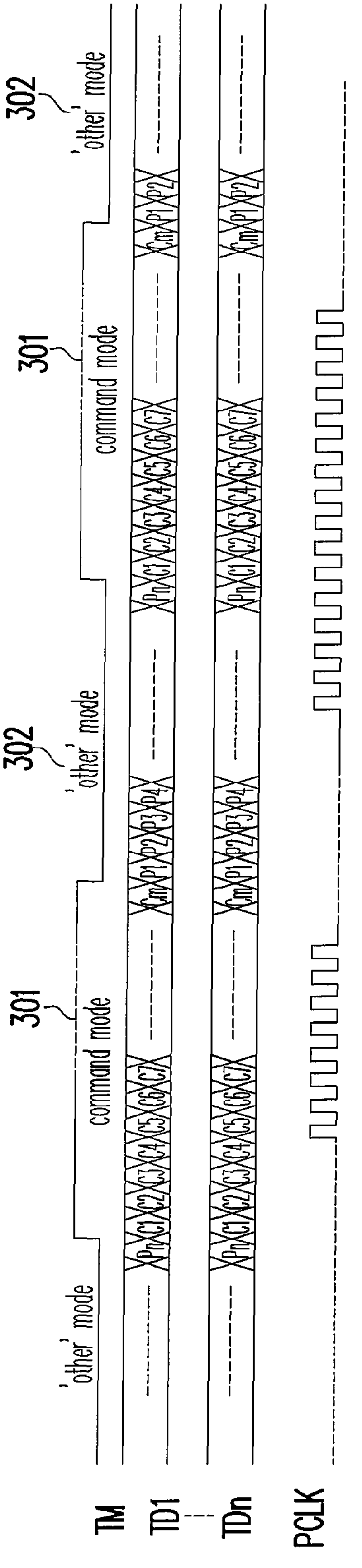
FIG. 3 is a control signal timing diagram of a display apparatus according to an embodiment of the present invention.

FIG. 3 is a timing diagram of the control signals according to an embodiment of the present invention. The encoding procedures completed by the control lines are shown in the diagram. The mode signal TM can be classified into two modes, namely, a command mode 301 with a high logic level '1' and an 'other' mode 302 with a low logic level '0'. In the present embodiment, the period when the mode signal TM is at a high logic level serves as a command mode period. In the 'other' mode 302, the method of operation is also consistently similar to the command mode 301. According to the actual requirements, the designer may expand the number of control lines of the command signals TD, TD1~TDn as shown in FIG. 3, to achieve greater flexibility and compatibility.

The method of operating the mode signal TM and the command signals TD1~TDn is quite simple. When the mode signal TM is at a high logic level '1', the command signals TD1~TDn enter the command mode in this period. During this command mode period, the command signals TD1~TDn define a plurality of command code periods according to the timing of the clock signal PCLK, shown as C1, C2, C3, . . . , Cm in FIG. 3. When the mode signal TM is at a low logic level '0', the command signals TD1~TDn enter the 'other' mode, represented by the 'other' signals P1, P2, P3, . . . , Pn in the diagram. To simplify the description, the present embodiment only uses a single control line of the command signals TD (for example, the command signal TD1).

Figure 4:
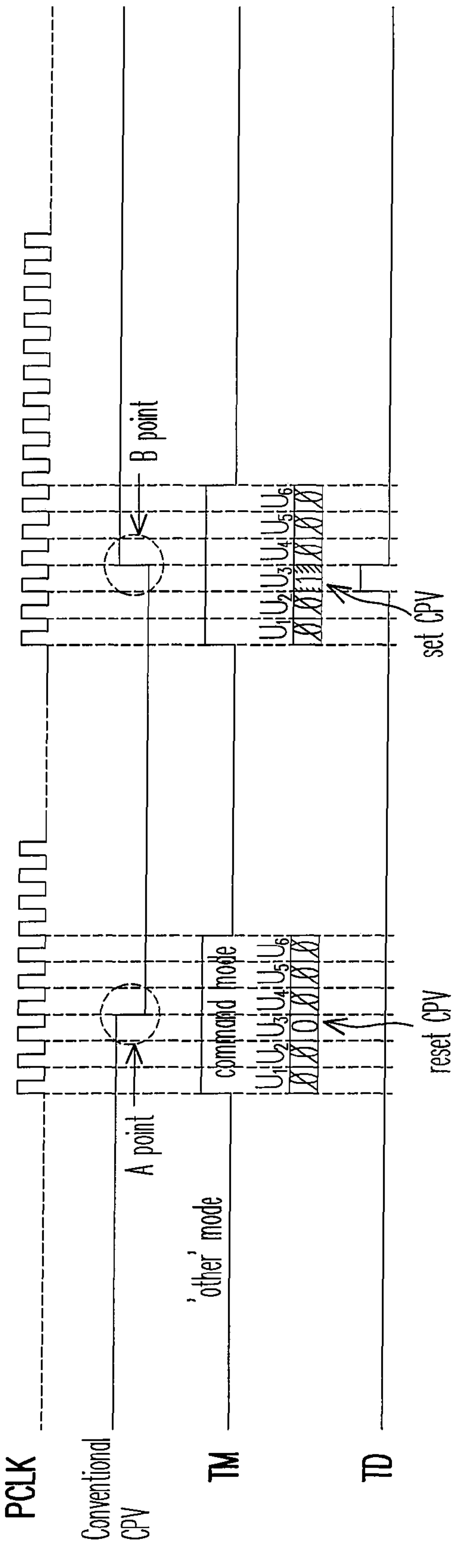
FIG. 4 is a timing diagram of a mode signal TM and a command signal TD according to an embodiment of the present invention.

FIG. 4 is a timing diagram showing the method of operation (the encoding method) of the mode signal TM and the command signal TD according to an embodiment of the present invention. When the control signal (for example, the gate clock signal CPV) that needs to be transmitted transits (for example, changing from a high logic level '1' to a low logic level '0') at a point A in time, the mode signal TM is triggered to transit to a high logic level and defines a command mode period 401 that comprises the time point A. During the command mode period 401 (the period in which the mode signal TM transits to a high logic level), the command signals TD define a plurality of command code periods according to the timing of the clock signal PCLK, represented by $U_1$, $U_2$, $U_3$, $U_4$, $U_5$ and $U_6$ in FIG. 4. Each one of the command mode periods $U_1$~$U_6$ represents the logic state of a corresponding control signal. For example, the command code period $U_3$ may represent the logic state of the gate pulse signal CPV. Thus, when the gate clock signal CPV at time point A is at a low logic level, the logic state of the command signals TD in the command code period $U_3$ is '0', which implies that the gate clock signal CPV will transit to a low logic level in the command code period $U_3$ (at the time point A).

Similarly, when the gate clock signal CPV that needs to be transmitted transits (for example, from a low logic level to a high logic level) at a point B in time, the mode signal TM is also triggered to transit to a high logic level and defines another command mode period 401 that comprises the time point B. When the gate clock signal CPV changes from a low logic level to a high logic level at time point B, the logic state of the command signals TD in the command code period $U_3$ is '1', which implies that the gate clock signal CPV will transit to a high logic level in the command code period $U_3$ (at time point B). Not only the encoding of other control signals such as the source clock signal LOAD, the output enable signal OE and so on may be carried out using the gate clock signal CPV as an example but also the mode encoding operation is simple.

The control signals in the present embodiment may be internal control signals of the display apparatus, for example, the control signal output by the timing controller of the display apparatus to the driver unit. These control signals may include the source start pulse STH, the line latching signal LOAD, the polarity signal POL, the gate start pulse STV, the gate clock signal CPV and the output enable signal OE. In some other specific applications, these control signals may include black insert control signals.

Figure 5:
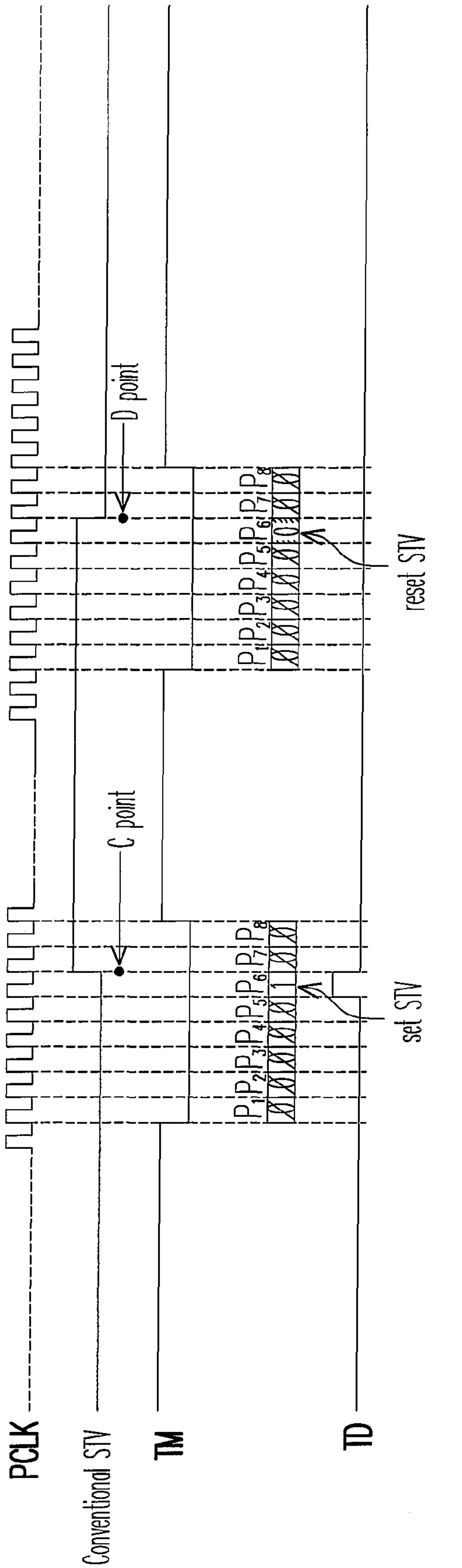
FIG. 5 is a timing diagram of a mode signal TM and a command signal TD according to an embodiment of the present invention.

Although the foregoing embodiment uses the transition of the mode signal TM to a high logic level as a trigger for defining a command mode period, however the present invention should not be limited thereto. For example, according to the actual requirements, the designer may use the transition of the mode signal TM to a low logic level to define the command mode period as shown in FIG. 5. In the present embodiment, the gate start pulse signal STV is used as an example to illustrate the operating method (encoding method) of the mode signal TM and the command signal TD. When the control signal (for example, the gate start pulse signal STV) that needs to be transmitted transits at point C in time (for example, changing from a low logic level to a high logic level), the mode signal TM is triggered to transit to a low logic level and defines a command mode period that comprises the time point C. During the command mode period (the period in which the mode signal TM transits to a low logic level), the command signals TD define a plurality of command code periods according to the timing of the clock signal PCLK, represented by $P_1$, $P_2$, $P_3$, $P_4$, $P_5$, $P_6$, $P_7$ and $P_8$ in FIG. 5. Each one of the command mode periods $U_1$~$U_8$ represents the logic state of a corresponding control signal. For example, the command code period $P_6$ may represent the logic state of the gate start pulse signal STV. Thus, when the gate start pulse signal STV at time point C is at a high logic level, the logic state of the command signals TD in the command code period $P_6$ is '1', which implies that the gate start pulse signal STV will transit to a high logic level in the command code period $P_6$ (at the time point C).

Similarly, when the gate start pulse signal STV that needs to be transmitted transits (for example, from a high logic level to a low logic level) at a point D in time, the mode signal TM is also triggered to transit to a low logic level and defines another command mode period that comprises the time point D. When the gate start pulse signal STV is at a low logic level at time point D, the logic state of the command signals TD in the command code period $P_6$ is '0', which implies that the gate start pulse signal STV will transit to a low logic level in the command code period $P_6$ (at time point D).

Therefore, regardless of the type of mode signal TM, the encoding operations can be easily carried out using this method as long as the command signals TD are combined with the requests in this protocol. Hence, the control signal lines required by the timing controller can be encoded to the mode signal TM and the command signals TD so that a large number of control signal lines are not required. It should be noted that other control signals such as the polarity signal POL, the gate clock signal CPV and the gate start pulse signal STV could be encoded using the foregoing encoding method and added to the command signals TD. Therefore, if any one of the control signal lines is activated at any time, the mode signal TM and the command signals TD can be utilized to transmit the control signal to the next stage circuit.

Figure 6:
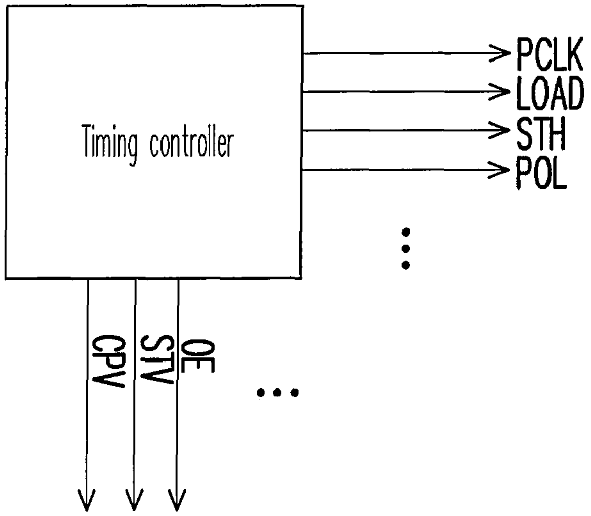
FIG. 6 (PRIOR ART)
FIG. 6 is a block diagram of a conventional timing controller.
Figure 7:
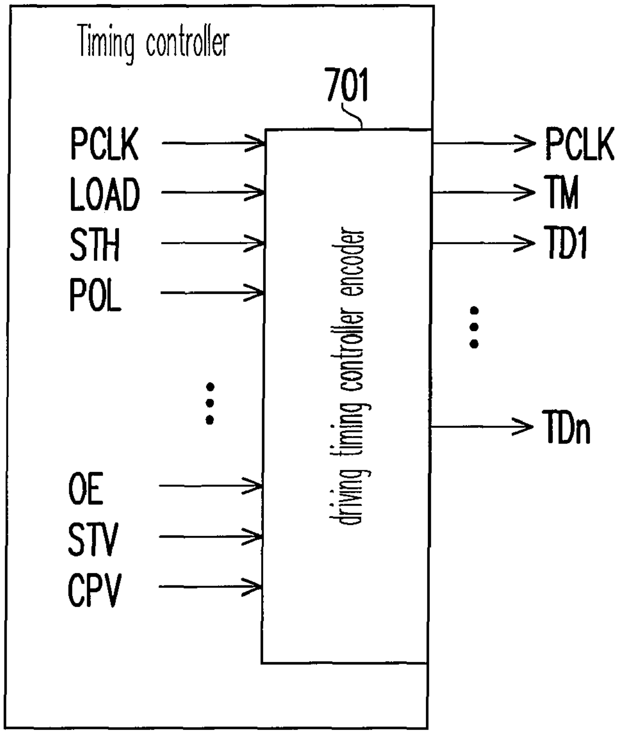
FIG. 7 is a block diagram of a timing controller according to an embodiment of the present invention.

FIG. 6 is a block diagram of a conventional timing controller. The control signals listed in FIG. 6 include a source start pulse STH, a line latching signal LOAD, a polarity signal POL, a gate start pulse STV, a gate clock pulse signal CPV and an output enable signal OE. FIG. 7 is a block diagram of a timing controller according to an embodiment of the present invention. As shown in FIG. 7, the timing controller in the present embodiment is based on the conventional timing controller, for example. Furthermore, by driving a timing control encoder 701, the control signals are encoded and at least one command signal TD1~TDn is added. In general, the fewer the command signals TD1~TDn, the better the design is. Theoretically, if simultaneous transition between various types of control signals can be avoided, only one command signal is required.

Figure 8:
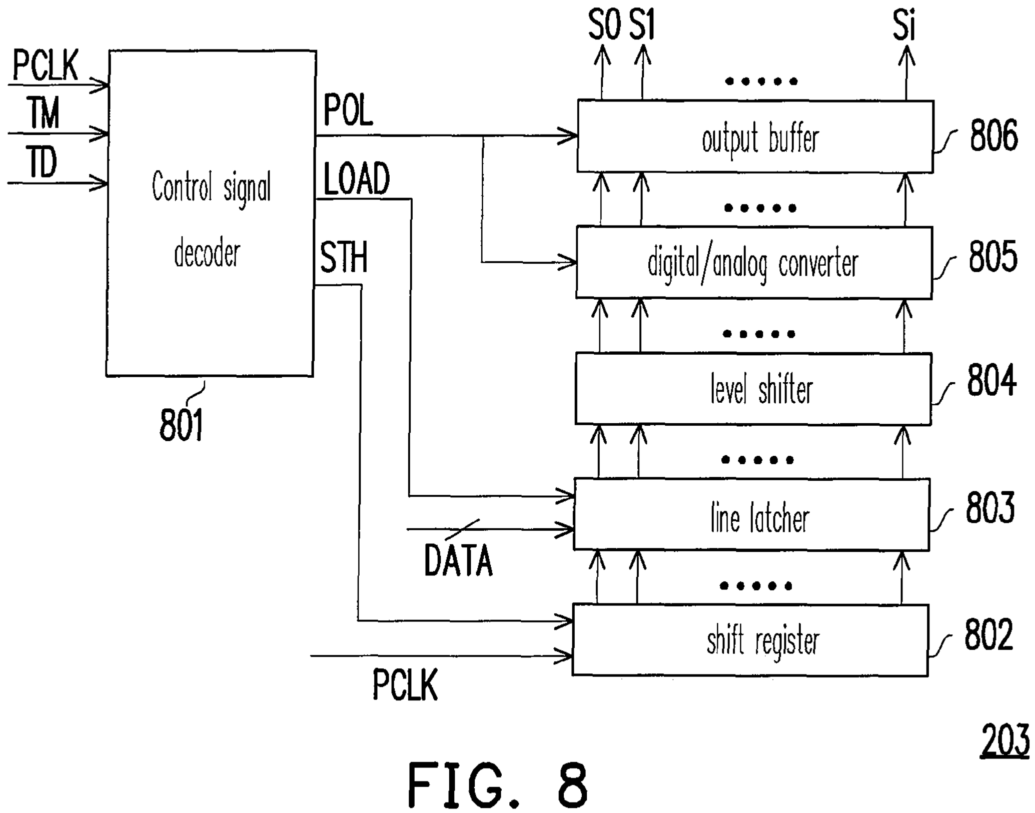
FIG. 8 is a circuit diagram of a source driver according to an embodiment of the present invention.

In addition, the control signals encoded inside the timing controller must be decoded inside the gate driver and the source driver. FIG. 8 is a circuit diagram of the source driver 203 shown in FIG. 2 according to an embodiment of the present invention. The source driver 203 includes a control signal decoder 801, a shift register 802, a line latch 803, a level shifter 804, a digital/analog converter 805 and an output buffer 806. In the present embodiment, the control signal decoder 801 receives the mode signal TM, the command signals TD and the clock signal PCLK from the timing controller 202 and decodes the received signals to recover the original control signals. Since the decoding action of the control signal decoder 801 may be inferred by performing the encoding operation described in the foregoing embodiment in reverse, a detailed description is omitted. The control signal decoder 801 decodes the few signals including the clock signal PCLK, the mode signal TM and the command signals TD to recover the timing waveforms of the control signals required by the source driver such as the polarity signal POL, the source start pulse signal STH and the line latching signal LOAD. In the present embodiment, because the configurations of the other blocks in the source driver 203 (that is, the shift register 802, the line latch 803, the level shifter 804, the digital/analog converter 805 and the output buffer 806) are basically identical to the ones inside a conventional source driver, a detailed description is omitted.

Figure 9:
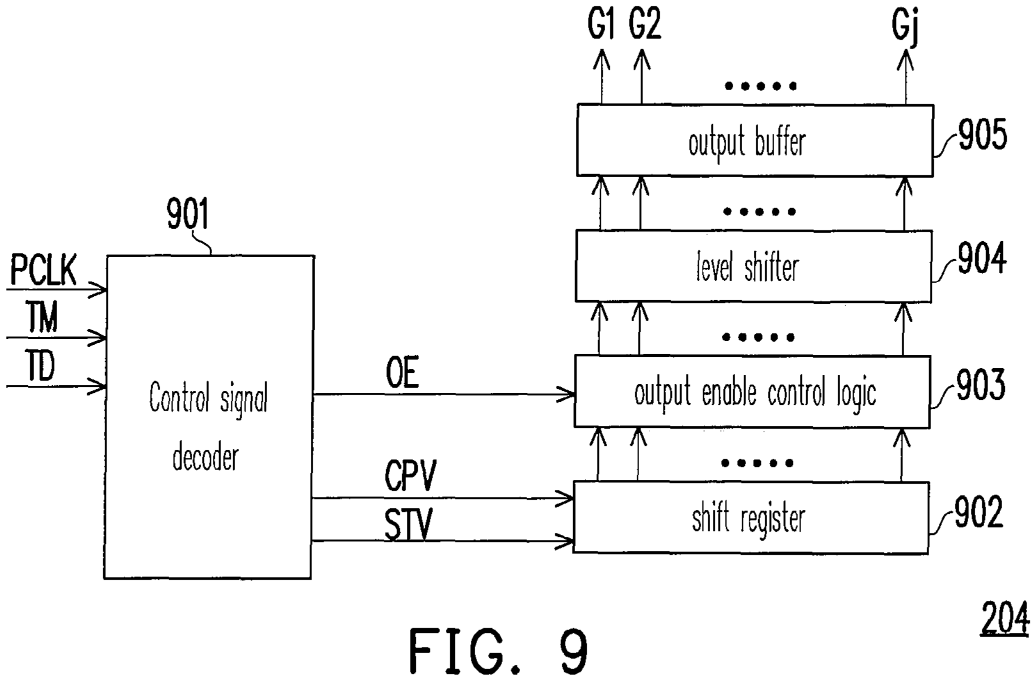
FIG. 9 is a circuit diagram of a gate driver according to an embodiment of the present invention.

A similar arrangement can be applied to the gate driver. FIG. 9 is a circuit diagram of the gate driver 204 shown in FIG. 2 according to an embodiment of the present invention. As shown in FIG. 9, the present embodiment uses a control signal decoder 901 to decode the command signals TD according to the clock signal PCLK and the mode signal TM and recover the control signals required by the gate driver including the output enable signal OE, the gate clock signal CPV and the gate start pulse signal STV. In fact, additional control signal can be decoded and recovered through the control signal decoder 901 so that the situation of having too many control signal lines crowded together can be avoided. In the present embodiment, because the configurations of the other blocks in the gate driver 204 (that is, the shift register 902, the output enable control logic 903, the level shifter 904 and the output buffer 905) are basically identical to the ones inside a conventional gate driver, a detailed description is omitted.

The difference in the number of circuit signal lines can be compared between a conventional driving apparatus and the one disclosed in the present invention. As shown in FIG. 1, the timing controller 102 in the conventional display apparatus must transmits the clock signal PCLK, the source start pulse STH, the line latching signal LOAD, the polarity signal POL and other signals to the source driver 103 through a number of circuit lines. Similarly, a plurality of signal lines must be disposed between the timing controller 102 and the gate driver 104 for transmitting various control signals including the gate start pulse signal STV, the gate clock signal CPV, the output enable signal OE and so on. Compared with the conventional display apparatus in FIG. 1, the display apparatus of the present invention comprises comparatively lesser number of control signal lines between the timing controller 202 and the driver units (the source driver 203 and the gate driver 204)

as shown in FIG. 2, which include the clock signal PCLK, the mode signal TM and the command signals TD.

In summary, the timing controller in the display apparatus of the present invention transmits simplified control signals. According to the timing of the clock signal PCLK and the mode signal TM, the control signals are encoded and then command signal TD is added so that fewer control signal lines (PCLK, TM and TD) may be required as opposed to several control signal lines to transmit signals to the driver units. Therefore, the number of control signal lines between the timing controller and the driver may be effectively reduced. Because fewer control signal lines are required to transmit the control signals, and therefore the space occupation of circuit layout may be reduced, the fabrication cost of the timing controller and the driver integrated circuit package may be effectively reduced, and the problems caused due to noise and electromagnetic interference may be effectively avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus, comprising:

a timing controller, for outputting an image data, a clock signal, a mode signal and at least one command signal according to a timing sequence, wherein the timing controller encodes a plurality of control signals and adds in the command signal according to the timing of the clock signal during a command mode period of the mode signal, wherein the command mode period of the mode signal is determined according to a transition of one of the control signals which is to be transmitted, the image data and the at least one command signal are transmitted via different signal lines, and the mode signal and the one of the control signals are transmitted via different signal lines;

a driver unit, coupled to the timing controller, for receiving the image data and decoding the command signal to recover the control signals according to the timing of the clock signal, a logic value of the command signal and the command mode period of the mode signal; and a display panel, coupled to the driver unit, for displaying pictures when driven by the driver.

2. The display apparatus of claim 1, wherein the driver unit comprises:

a gate driver, coupled between the timing controller and the display panel for driving the display panel according to the control of the timing controller; and a source driver, coupled between the timing controller and the display panel for receiving the image data and driving the display panel according to the control of the timing controller.

3. The display apparatus of claim 2, wherein the source driver comprises:

a control signal decoder, coupled to the timing controller, for decoding the command signal to recover and output the control signals according to the timing of the clock signal and the mode signal, wherein the control signals comprise a source start pulse, a line latching signal and a polarity signal;

a shift register, coupled to the control signal decoder, for receiving the source start pulse output by the control signal decoder according to the timing of the clock signal and transmitting the source start pulse by stages of the shift register for outputting to serve as a channel latching signal;

a line latch, coupled to the control signal decoder and the shift register, for latching the image data according to the timing of the channel latching signal and outputting the latched image data according to the timing of the line latching signal output by the control signal decoder;

a level shifter, coupled to the line latch, for receiving and changing the level of the image data output by the line latch;

a digital/analog converter, coupled to the control signal decoder and the level shifter, for converting the image data output by the level shifter to an analog driving signal with a corresponding polarity according to the polarity signal output by the control signal decoder; and an output buffer, coupled to the digital/analog converter, for receiving the analog driving signal and driving the display panel.

4. The display apparatus of claim 2, wherein the gate driver comprises:

a control signal decoder, coupled to the timing controller, for decoding the command signal to recover and output the control signal according to the timing of the clock signal and the mode signal, wherein the control signals comprise the gate start pulse, the gate clock signal and the output enable signal;

a shift register, coupled to the control signal decoder, for receiving the gate start pulse and outputting the gate start pulse by stages to serve as a scan signal according to the timing of the gate clock signal;

an output enable control logic, coupled to the control signal decoder and the shift register, for receiving and outputting the scan signals, wherein the output of the output enable control logic is controlled by the output enable signal;

a level shifter, coupled to the output enable control logic, for receiving and changing the output level of the output enable control logic; and an output buffer, coupled to the level shifter, for receiving the output of the level shifter and driving the display panel.

5. The display apparatus of claim 1, wherein the control signals comprise a source start pulse, a line latching signal and a polarity signal.

6. The display apparatus of claim 1, wherein the control signals comprise a gate start pulse, a gate clock pulse and an output enable signal.

7. The display apparatus of claim 1, wherein the control signals comprise a black insert control signal.

8. The display apparatus of claim 1, wherein the display panel comprises a liquid crystal display panel.

9. A method for transmitting control signals, comprising:

providing a plurality of control signals;

encoding and adding the control signals in at least one command signal during a command mode period, wherein the command mode period is defined via a mode signal according to a transition of one of the control signals which is to be transmitted, an image data and the at least one command signal are transmitted via different signal lines, and the mode signal and the one of the control signals are transmitted via different signal lines, a plurality of command code periods is defined in the command mode period by referring to a timing of a clock signal, wherein each of the command code periods represents one of the control signals, and a logic value of the command signal in the command code periods is determined according to a state of the corresponding control signal;

transmitting the clock signal, the mode signal and the command signal to a next stage circuit; and decoding the command signal through the next stage circuit according to the timing of the clock signal, the logic value of the command signal and the command mode period of the mode signal to recover the control signals.

10. The method of control signals of claim 9, wherein the mode signal is set to an enable state when one of the control signals has a level transition, wherein the period in which the mode signal is enabled is the command mode period.

11. The method of control signals of claim 10, wherein the logic value of the command signal in the corresponding command code period is set to 1 if one of the control signals is at a logic high level in the command mode period.

12. The method of control signals of claim 10, wherein the logic value of the command signal in the corresponding command code period is set to 0 if one of the control signals is at a logic low level in the command mode period.

13. The method of control signals of claim 9, wherein the control signals comprise internal control signals of the display apparatus.

14. The method of control signals of claim 13, wherein the control signals comprise control signals output by a timing controller inside the display apparatus to a driver unit.

15. The method of control signals of claim 14, wherein the control signals comprise a source start pulse, a line latching signal and a polarity signal.

16. The method of control signals of claim 14, wherein the control signals comprise a gate start pulse, a gate clock signal and an output enable signal.

17. The method of control signals of claim 14, wherein the control signals comprise a black insert control signal.

18. The method of control signals of claim 14, wherein the display apparatus comprises a liquid crystal display.

19. A method for transmitting control signals of a display apparatus, comprising:

providing a plurality of control signals;

providing an image data;

encoding and adding the control signals in at least one command signal according to a timing of a clock signal during a command mode period of a mode signal, wherein the command mode period of the mode signal is determined according to a transition of the control signal which is to be transmitted, the image data and the at least one command signal are transmitted via different signal lines, and the mode signal and the one of the control signals are transmitted via different signal lines;

transmitting the image data, the clock signal, the mode signal and the command signal to a driver unit;

decoding the command signal through the driver unit according to the timing of the clock signal, a logic value of the command signal and the command mode period of the mode signal to recover the control signals; and driving a display panel through the driver unit according to the image data and the control signals.

20. The method for transmitting control signals of a display apparatus of claim 19, wherein the step of encoding and adding the control signals in the command signal comprises:

defining a command mode period by using the mode signal;

defining a plurality of command code periods in the command mode period by referring to the timing of the clock signal, wherein each of the command code periods represents one of the control signals; and determining the logic value of the command signal in the command code period according to a state of the control signals.

21. The method for transmitting control signals of a display apparatus of claim 20, wherein the mode signal is set to an enable state when one of the control signals has a level transition, wherein the period in which the mode signal is enabled is the command mode period.

22. The method for transmitting control signals of a display apparatus of claim 21, wherein the logic value of the command signal in the corresponding command code period is set to 1 if one of the control signals is at logic high level in the command mode period.

23. The method for transmitting control signals of a display apparatus of claim 21, wherein the logic value of the command signal in the corresponding command code period is set to 0 if one of the control signals is at a logic low level in the command mode period.

24. The method for transmitting control signals of a display apparatus of claim 19, wherein the control signals comprise a source start pulse, a line latching signal and a polarity signal.

25. The method for transmitting control signals of a display apparatus of claim 19, wherein the control signals comprise a gate start pulse, a gate clock signal and an output enable signal.

26. The method for transmitting control signals of a display apparatus of claim 19, wherein the control signals comprise a black insert control signal.

27. The method for transmitting control signals of a display apparatus of claim 19, wherein the display panel comprises a liquid crystal display panel.

* * * * *